(12) United States Patent
Gartner et al.

(10) Patent No.: US 8,468,102 B2
(45) Date of Patent: Jun. 18, 2013

(54) CREATION OF AD HOC SOCIAL NETWORKS BASED ON ISSUE IDENTIFICATION

(75) Inventors: Jeffrey G. Gartner, Hopewell Junction, NY (US); Bryan S. Katz, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 516 days.

(21) Appl. No.: 12/640,158

(22) Filed: Dec. 17, 2009

(65) Prior Publication Data
US 2011/0153588 A1    Jun. 23, 2011

(51) Int. Cl.
*G06Q 10/00*    (2012.01)
(52) U.S. Cl.
USPC .......................................................... 705/319
(58) Field of Classification Search
USPC .............................................. 705/1, 1.1, 319
See application file for complete search history.

(56) References Cited

U.S. PATENT DOCUMENTS

| 7,266,537 | B2 | 9/2007 | Jacobsen et al. |
| 2003/0004802 | A1* | 1/2003 | Callegari ......................... 705/14 |
| 2004/0044542 | A1* | 3/2004 | Beniaminy et al. ................ 705/1 |
| 2005/0177414 | A1 | 8/2005 | Priogin et al. |
| 2007/0016689 | A1* | 1/2007 | Birch ............................. 709/241 |
| 2008/0005072 | A1 | 1/2008 | Meek et al. |
| 2008/0040427 | A1* | 2/2008 | Shroff et al. ................... 709/204 |
| 2008/0154951 | A1* | 6/2008 | Martinez et al. ........... 707/103 Y |
| 2010/0070503 | A1* | 3/2010 | Abraham ....................... 707/737 |

OTHER PUBLICATIONS

Qing Gao, et al.; "A High-precision Forum Crawler Based on Vertical Crawling;" Proceedings of IC-NIDC2009; Nov. 6, 2009; pp. 362-367; IEEE; Piscataway, NJ.
Matthew Hurst, et al.; "Social Streams Blog Crawler;" IEEE International Conference on Data Engineering; Mar. 29, 2009; pp. 1615-1618; IEEE; Piscataway, NJ.
Mei Kobayashi, et al.; "Information Retrieval on the Web;" Apr. 25, 2000; pp. 1-47; Japan.
U.S. Appl. No. 12/270,443, filed Nov. 13, 2008, entitled "System and Method for Identifying and Managing Customer Needs," by Kohler et al.

* cited by examiner

*Primary Examiner* — Gabrielle McCormick (57) ABSTRACT

An external network is crawled (searched) to identify issues that may exist in the external network. Once an issue is identified, internal networks are crawled to determine one or more experts on the issue. A social network of the one or more experts is created. This way, the experts can quickly address the issue.

As part of the creation of the social network, a template can be created that contains the issue, sub-issues associated with the issue, a ranking of the issues/sub-issues, and a form that allows the experts to interact and address the issue/sub-issues. In addition, the identified experts can be refined based on their availability to address the issue. The template can provide the ability to respond to users of the external networks in a manner consistent with the external networks.

36 Claims, 5 Drawing Sheets

CREATION OF AD HOC SOCIAL NETWORKS BASED ON ISSUE IDENTIFICATION

TECHNICAL FIELD

The system and method relates to the creation of ad hoc social networks, and in particular the on-demand creation of social networks based on identification of issues.

BACKGROUND

When issues arise in social networks, identification of an issue to a contact center agent or other resource may be beneficial in order to provide better customer support. Traditional contact centers may only become aware of an issue well after the issue was discussed on different social networks. This may leave the contact center in a position where agents are not properly advised of the issue and how to address the issue with customers. It also allows for an issue to fester instead of addressing it as the issue first surfaces.

What is needed is not only a way to quickly identify the issue, but also a way to quickly address the issue. This way, agents in the contact center will become aware of the issue earlier and be able to work with customers to resolve the issue; this results in better customer satisfaction.

SUMMARY

The system and method are directed to solving these and other problems and disadvantages of the prior art. An external network is crawled (searched) to identify issues that may exist in the external network. Once an issue is identified, internal networks are crawled to determine one or more experts on the issue. A social network of one or more experts is created. This way, the experts can quickly address the issue.

As part of the creation of the social network, a template can be created that contains the issue, sub-issues associated with the issue, a ranking of the issues/sub-issues, age of the issue, and a form that allows the experts to interact and address the issue/sub-issues. In addition, the identified experts can be refined based on their availability to address the issue. The template can provide the ability to respond to users of the external networks in a manner consistent with the external networks.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
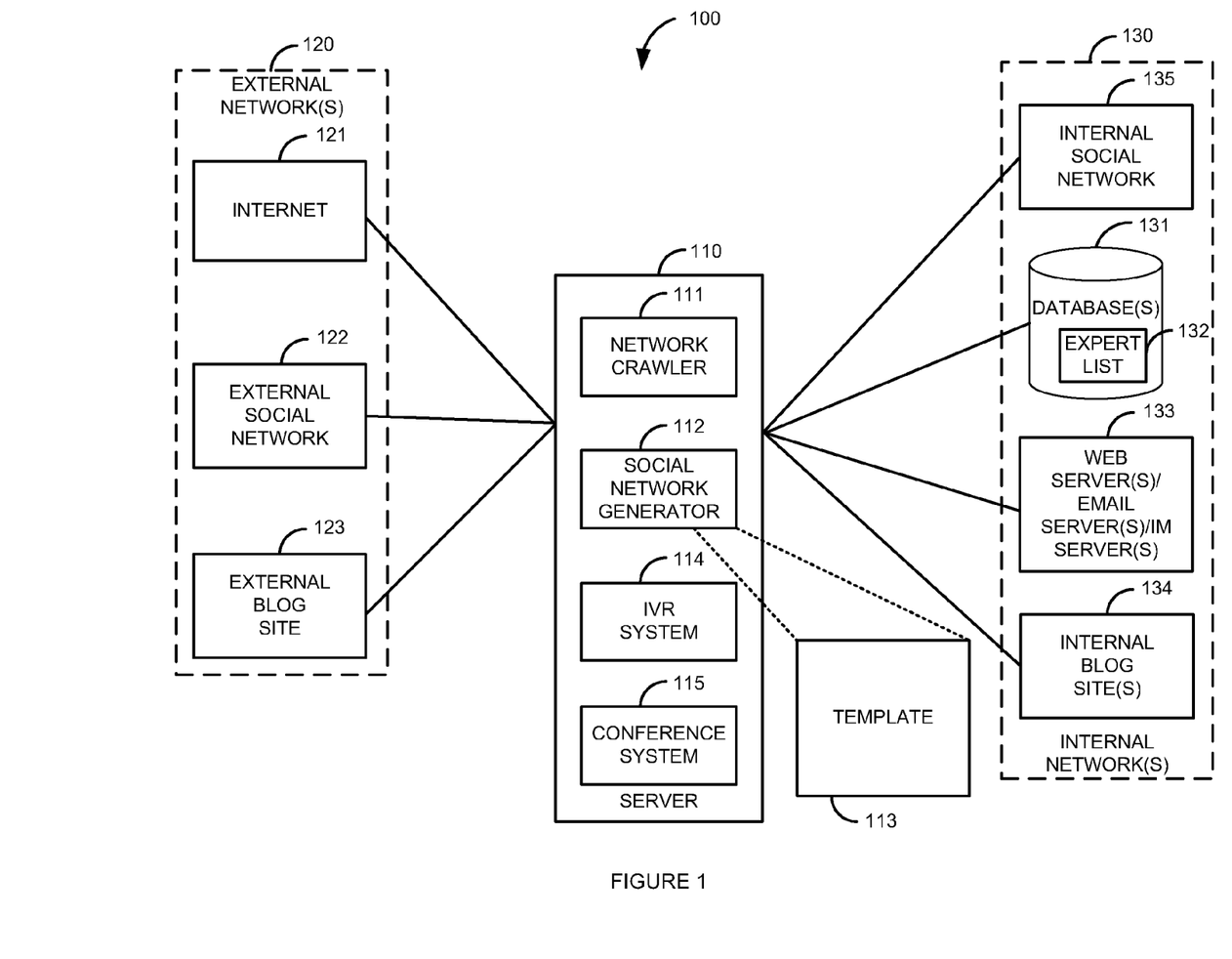
FIG. 1 is a block diagram of a first illustrative system for identifying issues in external network(s) and creating a social network to address the issue.

FIG. 1 is a block diagram of a first illustrative system 100 for identifying issue(s) in external network(s) 120 and creating a social network 122 to address the issue(s). The first illustrative system 100 comprises external network(s) 120, a server 110, and internal network(s) 130. The external network(s) 120 can comprise various types of networks, including but not limited to the Internet 121, social network(s) 122, external blog site(s) 123, and the like. The external network 120 can be any type of network where information is posted including Local Area Networks (LAN), Wide Area Networks, and the like. The external network 120 is a network that is physically or virtually external to a company, contact center, a resource, and the like.

The internal network 130 can comprise various types of networks such as a database 131, a web server, email server, Instant Messaging server 133, internal blog site(s) 134, an internal social network 135, and the like. The internal network(s) 130 can be any network that is physically or virtually internal to a company, contact center, a resource, and the like. The internal network(s) 130 can be a physical internal network 130, or a virtual internal network 130. For example, a physical internal network 130 can be an internal network 130 that is isolated by a firewall or some other type of physical device that restricts access. On the other hand, a virtual internal network 130 can be a blog site that can be accessed by experts of a company. A virtual internal network 130 can be a grouping of employees of a company that converse using different types of communication processes at known sites/networks.

The server 110 comprises a network crawler 111, a social network generator 112, optionally an Interactive Voice Response (IVR) system 114, and optionally a conferencing system 115. The network crawler 111 can be any device/process capable of crawling (i.e., scanning/searching a network) different networks (120, 130). The social network generator 112 can be any device/process capable of creating a social network (122, 135) such as a web server, a software application, and the like. The social network generator 112 can create a template 113. A template 113 can be a form used in the creation of a social network (122, 135). The template can be in the form of a web page(s), graphical user interface(s), played message(s), played menu(s) in the Interactive Voice Response (IVR) system 114, and the like. The Interactive Voice Response system 114 can be any system capable of playing messages and receiving responses from a user. The IVR system 114 can include voice and/or video responses (i.e., recognizing gestures for video responses). The conferencing system 115 can be any system capable of conferencing voice and/or video communications. The network crawler 111, the social network generator 112, the IVR system 114, and the conference system 115 are illustratively shown in the server 110. However, the network crawler 111, the social network generator 112, the IVR system 114, and the conference system 115 can be separate and/or distributed between different devices/systems.

The network crawler 111 crawls the external network(s) 120 to identify an issue(s) and sub-issue(s). There are various ways the external network 120 can be crawled to identify the issue. For example, U.S. patent application Ser. No. 12/270,443, which is incorporated herein by reference, discloses a way to crawl a network to identify an issue. In addition, the network crawler 111 can also crawl some or the entire internal network 130. The issue can be identified based on various factors such as: a prior history of a person generating the issue and/or one or more sub-issues, a tone of a discussion, a prominence of a name (e.g., a company name), a prominence of a key word, time spent as a customer, age of the issue and/or sub-issue, a standing of a person making an observation, and the like.

The issue/sub-issue can be based on various factors such as positive and/or negative factors. For example, the issue may be based on negative factors such as a problem with a product, a negative response to an advertisement, a negative response to a political candidate, and the like. The issue can be a positive issue such as a customer's recommendations for a product, a positive response to an advertisement, a positive response to a political candidate, and the like.

The network crawler 111 crawls the internal network(s) 130 to determine one or more experts on the issue. In addition, the network crawler 111 can also crawl the external network 130. The network crawler 111 can crawl the internal social network 135, a database 131 that has an expert list 132, a web server/email/IM server 133, internal blog sites 134, and the like. The network crawler 111 can crawl the expert list 132 to determine if there is an expert associated with the issue(s). The expert list 132 can be crawled to determine an expert(s) along with the crawling of other internal networks 130, for example, using keywords related to the issue to potentially identify other experts on the issue. The social network generator 112 creates a social network (122, 135) of the one or more experts to address the issue(s). The social network 122 can be organized in various ways. For example, the social network can be an external blog site 123, an internal blog site 134, and the like. The social network 122 can be an audio social network, a video social network, a text-based social network, or any combination of these.

For example, in creating an audio/video social network, the conference system 115 can call experts in various ways (e.g., sending an Instant Message with click to join a voice conference call of the experts); this can be based on an availability attribute of the identified experts. An availability attribute can be, for example, an Instant Messaging Status, if the expert is on the phone, the expert's calendar, and the like. After identifying the expert(s) and optionally filtering the list based on one or more availability attributes, a conference call is set up between the experts. For the audio portion of the conference call, the IVR system 114 can provide an audio template 113 that includes a series of IVR menu choices that allow the expert(s) to vocally respond to the issues/sub-issues on the external network(s) 120. The issue(s) can be presented to the experts in an audio format. Information from the external network(s) 120 where the issue resides can also be presented in an audio format to the experts. The vocal response of the expert(s) can be converted to text (if the external network 120 that created the issue requires text) and sent to the appropriate external network(s) 120 that refer to the issue.

The sent response (text, voice, and/or video depending on the external network 120) can be adjusted to fit the capabilities of the external network 120. For example, if one of the external networks 120 only allows text responses of 140 words or less, then the sent text response will be limited to less than 140 words. If a different external network 120 allows text messages of 500 words, then the sent message will be limited to 500 words or less. This can be accomplished by the IVR system 114 notifying the expert(s) of the limit before and/or when approaching the limit of the external network 120. Using this format, the experts can respond appropriately to the external network(s) 120.

The sent response can address either positive or negative issues. For example, if the issue is a positive feedback by customers in using a product, the sent response could be suggestions by the experts of additional products that can be purchased by customers using the product.

Figure 2:
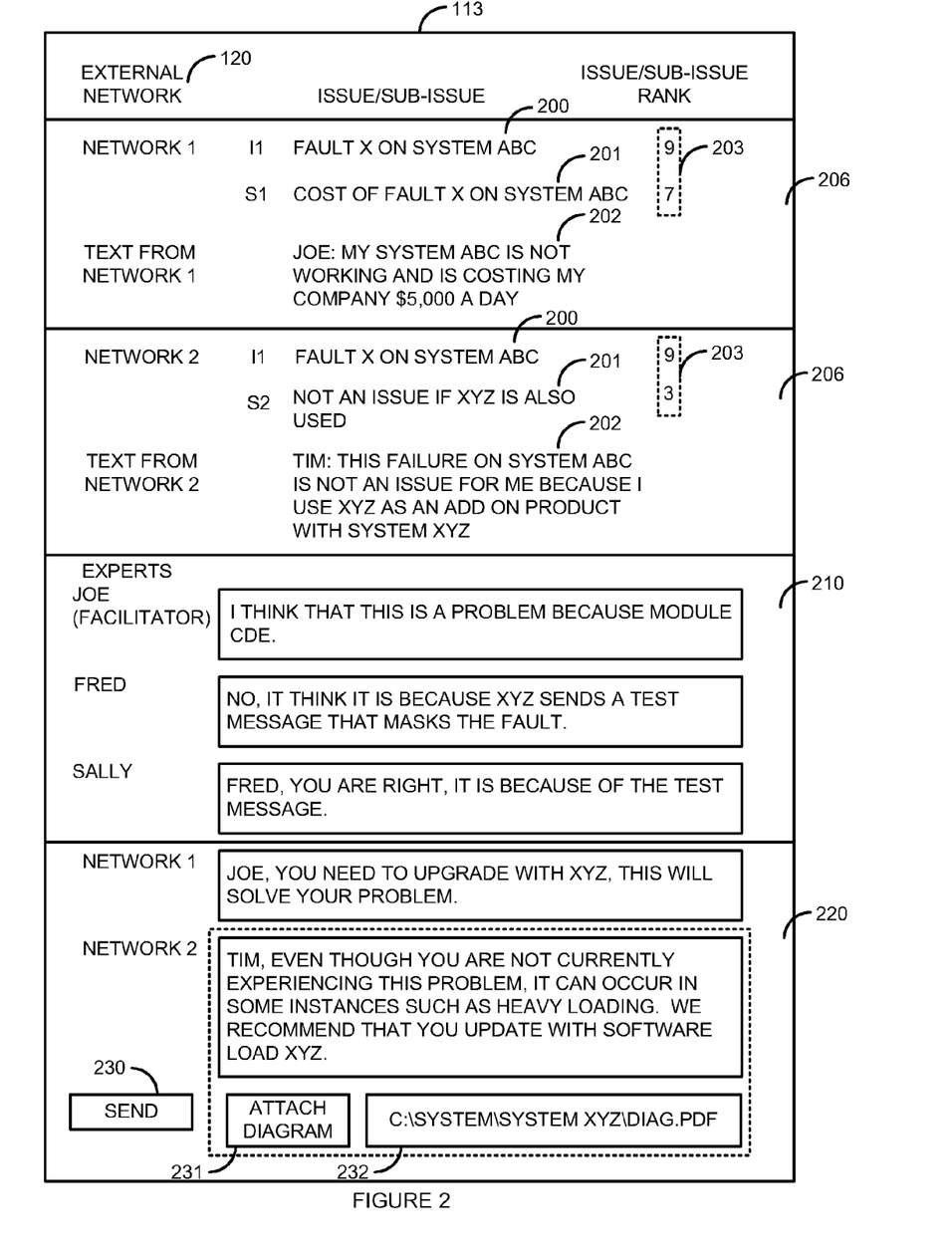
FIG. 2 is a diagram of an illustrative template for creation of a social network to address the issue.

FIG. 2 is a diagram of an illustrative template 113 for creation of a social network (122, 135) to address the issue 200. The template 113 in FIG. 2 is an illustrative example of a visual template 113 that can be used in a graphical user interface, on a blog site (123, 134), and the like. The template 113 creates a format that is used by the experts to address the issue(s) 200 on the external network(s) 120. The template 113 is illustratively organized into three sections: the external network section 206, the comment section 210, and the response section 220.

In this illustrative example, one issue 200 has been identified on two external networks 120 (shown as network 1 and network 2 in the template 113). There is one external network section 206 for external network 1 and one external network section 206 for network 2. The issue 200 for external network 1 is that there is a fault X on system ABC. In network 1, there is also an identified sub-issue 201 (cost of fault X on system ABC). Information from the external network 1 (202) is shown (Joe: My system ABC is not working and is costing my company $5,000 a day). The shown information from the external network 120 can also be a link that can be clicked on to allow the experts to go to the actual external network 120 (e.g., the post by Joe). The issue 200 and the sub-issue 201 for network 1 are ranked 203 (e.g., a ranking of 1-10). The ranking 203 can be ordered based on specific keywords, an occurrence of words, a tone of a word, a number of external networks 120 that have the issue 200 and the keyword, and the like.

Likewise, the issue 200, the information from external network 2 (202), and the ranking are shown for external network 2 in the external network section 206 for network 2. For external network 2, a different sub-issue 201 (not an issue 200 if XYZ is also used) is identified. The external network sections 206 are each only shown with one example text from the external networks 120. However, there can be multiple texts (e.g., for each post with the issue 200 on each external network 120) with links to each.

The experts (Joe, Fred, and Sally) can address the issue 200 and sub-issues 201 in the comment section 210. In the comments section 210, Joe has been identified as a facilitator of the discussion. The layout for the comment section 210 is shown as an illustrative example of one of many ways the experts can respond. For example, the comment section 210 could use emails, Instant Messaging, voice conferences, video conferences, and the like for communication between the experts.

Once a solution for the issue 200 has been determined, the experts can send a response using the response section 220. In this example, response section is adjusted (customized) based on the capabilities of the external network 120. For example, external network 1 has a smaller area for entering text because external network 1 can only receive messages of a limited text size (e.g., 100 words). External network 2 has a larger area for entering text because external network 2 can receive messages of a larger size (e.g., 1000 words). In addition, external network 2 can receive and display image documents (e.g., JPEGs, PDFs, and the like). In response to external network 2 being able to handle image documents, an attach diagram button 231 and a path to the image dialog 232 are dynamically created to allow the user to add an image document if necessary. The experts can send using the send button 230 the response(s) to the external networks 120 (external network 1 and external network 2). In this illustrative example, there is one send button 230 for both external networks 120. However, an individual send button 230 for each external network 120 can be created.

Figure 3:
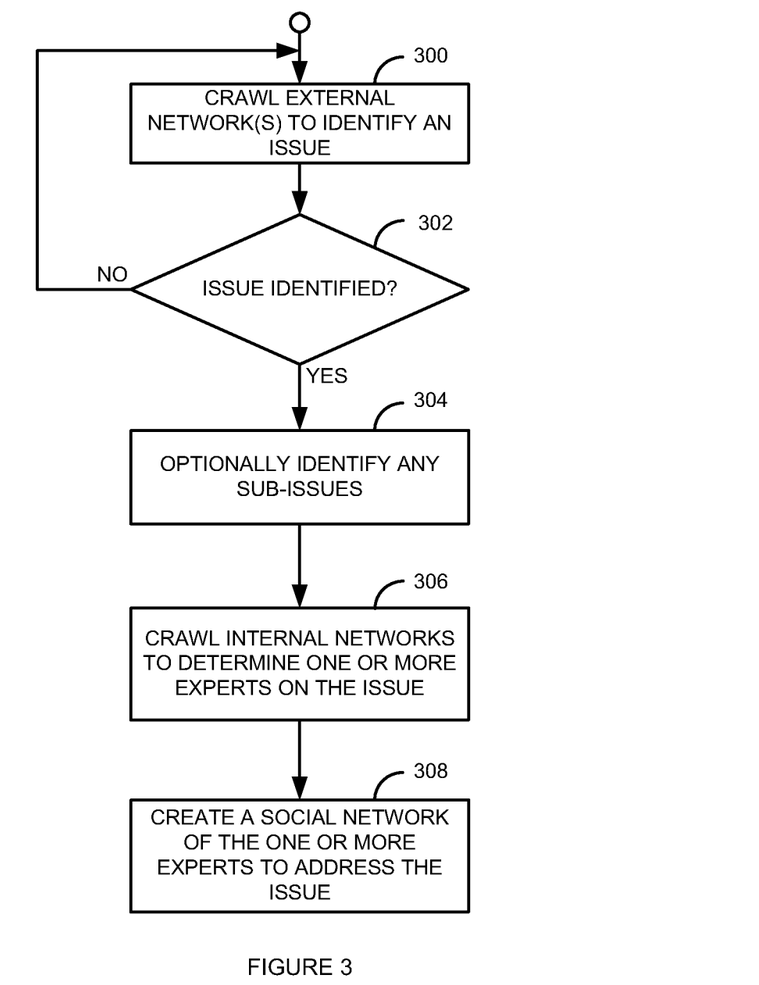
FIG. 3 is a flow diagram of a method for identifying issues in external network(s) and creating a social network to address the issue.

FIG. 3 is a flow diagram of a method for identifying issues 200 in external network(s) 120 and creating a social network (122, 135) to address the issue 200. Illustratively, the network crawler 111, the social network generator 112, the IVR system 114, and the conference system 115 are stored-program-controlled entities, such as a computer or processor, which performs the method of FIGS. 3-5 by executing a program stored in a storage medium, such as a memory or disk.

The process begins when the network crawler 111 crawls 300 the external network(s) 120 to identify an issue(s) 200 in the external network(s) 120. The network crawler 111 determines if an issue(s) 200 has been identified in step 302. If an issue(s) 200 has not been identified in step 302, the process goes to step 300. Otherwise, if an issue(s) 200 has been identified in step 302, the process goes to step 304. The network crawler 111 can optionally identify 304 any sub-issues 201 on the external network(s) 120 where the issue(s) 200/sub-issue 201 was identified.

The network crawler 111 crawls 306 the internal network(s) 130 to determine one or more experts on the issue(s) 200/sub-issue(s) 201. The network crawler can determine different experts based on individual issues 200 and/or individual sub-issues 201. The social network generator 112 creates 308 a social network (122, 135) of the one or more experts to address the issue 200. The social network can be an external social network 122, an internal social network 135, a combination of both, and the like.

Figure 4:
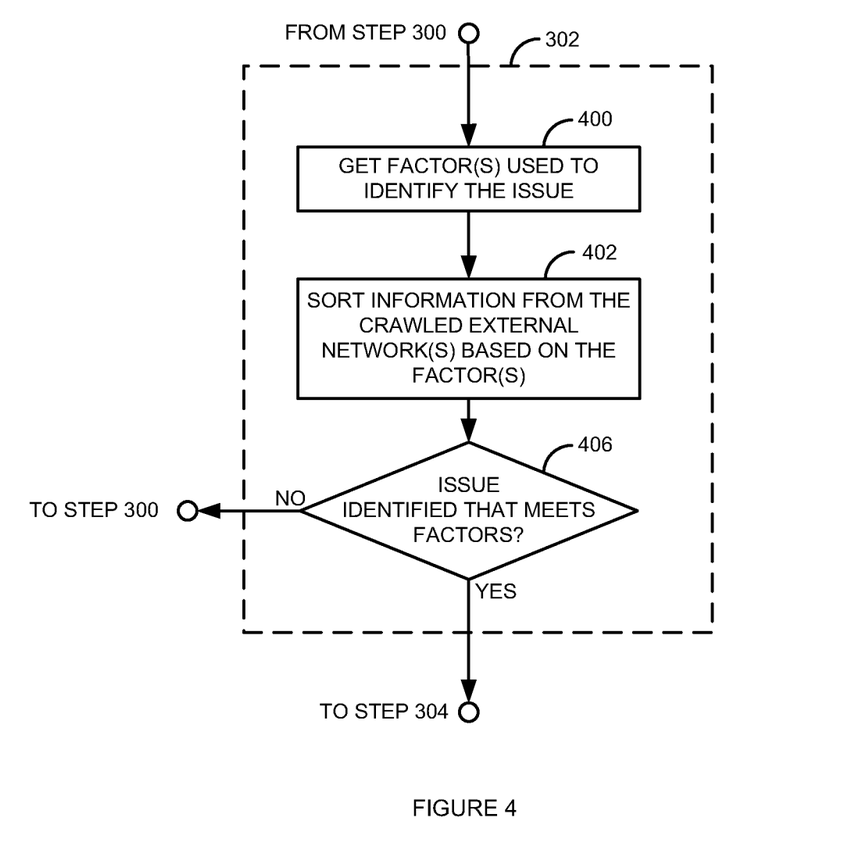
FIG. 4 is a flow diagram of a method for identifying issues in external network(s).

FIG. 4 is a flow diagram of a method for identifying issues 200 in external network(s) 120. FIG. 4 is an expanded view of step 302 in FIG. 3. After step 300, the network crawler 111 gets 400 factor(s) used to identify the issue 200. These factor(s) can be based on a variety of key things such as the tone of the discussion, the number of discussions on a topic, the prominence of the vendor's name, the social network standing of the individual making the observations, how many times the vendor is named, a vendor's product name, looking for key words in conversations, and the like. The factors can be inferred, ranked, and/or determined probabilistically based multiple factors.

The network crawler 111 sorts 402 information from the crawled external network(s) 120 based on the factors to determine if there is an issue 200. For example, the crawler could crawl the external network 120 and determine that at blog site 123 and the external social network 122 the issue of "failure," "Product ABC," and "Vendor XYZ" were mentioned in 37 blog postings on blog site 123 and in 26 posts on the external social network 122 in a 30-minute interval; this is in contrast to no posts being recorded the day before. This sudden jump in activity could be triggered based on a threshold of 20 postings in a 24-hour period. The result is that the network crawler 111 can identify the issue of "53 posts of Failure of Product ABC by Vendor ZYZ in the last 30 minutes." If there is an identified issue 200 in step 406 the process goes to step 304. If there is not an identified issue 200 in step 406, the process goes to step 300.

Figure 5:
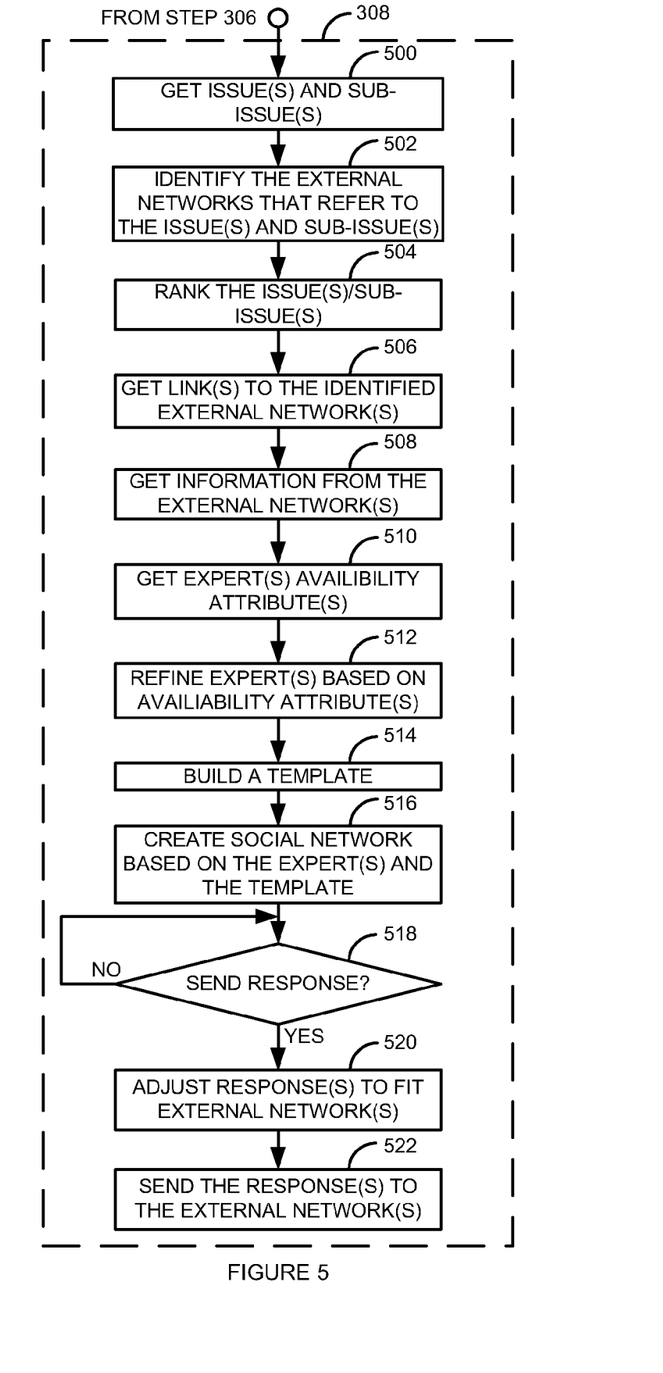
FIG. 5 is a flow diagram of a method for building a template for a social network.

FIG. 5 is a flow diagram of a method for building a template 113 for a social network (122, 135). FIG. 5 is an expanded view of step 308 in FIG. 3. After step 306 the social network generator 112 gets 500 the issue(s) 200 and sub-issues 201. The social network generator 112 identifies 502 the external networks 120 that refer to the issue(s) 200/sub-issue(s) 201. The social network generator 112 ranks 504 the issue(s) 200/sub-issue(s) 201. The social network generator 112 gets 506 the link(s) to the identified external networks 120. The links to the identified external networks 120 can be identified during the crawling of the external networks 120. The link can be a link to a specific external blog site 123, to the initial thread of a sequence of blogs, a link to a web page, and the like.

The social network generator 112 gets 508 information 202 from the external networks 120. The information 202 can be portions of a post, portions of a blog, a sequence of posts, a sequence of blogs, part of a Really Simple Syndication (RSS) feed, audio files, images, video streams, and the like. The social network generator 112 gets 510 an availability attribute(s) for the expert(s). The social network generator 112 refines 512 the expert(s) based on the availability attribute(s). The social network generator 112 builds 512 a template 113 that is used to build a display (or audio conference/video conference) for conveying the issue(s) 200, the sub-issues 201, the information from the external network 202, the links to the external networks, and the refined expert(s).

The social network generator 112 creates 516 a social network (122, 135) based on the expert(s), preferably using the template 113. If social network generator 112 determines in step 518 that the expert(s) does not want to send a response, the process stays in step 518. If one of the experts wants to send a response (e.g., one of the experts clicks on the send button 230), the process goes to step 520. If an indication to send a response is detected in step 518, the social network generator 112 adjusts 520 the response(s) to fit within the requirements of the external network 120 where the response is being sent. The social network generator 112 sends 522 the response(s) to the external network(s) 120.

If the same issue 200 and/or sub-issue 201 are identified on the same or a different social network (122, 135), steps 520 and 522 can be automatically repeated to send a response to the social network (122, 135). The methods described in FIGS. 3-5 can also be used to crawl the same networks to identify any feedback from users to determine if the solution to the issue 200/sub-issue 201 has been effective. The feedback can be, for example, the additional comments on a blog site after receiving the response to the issue 200/sub-issue 201.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a system, the method comprising:
   a. in a server, crawling one or more external networks to identify an issue in the one or more external networks;
   b. in the server, determining the capabilities of the one or more external networks;

c. in the server, crawling one or more internal networks to determine one or more experts on the issue;

d. in the server, creating a social network of the one or more experts to address the issue; and e. in a server, creating a template for the social network, wherein the template comprises a response section for the one or more external networks based on a determined capability of the one or more external networks.

2. The method of claim 1, further comprising:

creating, from the template that defines how to organize information about the issue gathered from the one or more external networks, a blog for presenting the information; and providing the blog to the experts in the social network.

3. The method of claim 2, wherein the issue is identified on a plurality of external networks and the issue further comprises one or more sub-issues and further comprises the step of identifying which of the one or more sub-issues are on each of the plurality of networks.

4. The method of claim 3, wherein the issue and the one or more sub-issues are identified in the blog based on a ranking.

5. The method of claim 4, wherein the issue and/or the one or more sub-issues are identified based on at least one of the following factors: a prior history of a person generating the issue and/or one or more sub-issues, a tone of a discussion, a prominence of a name, a prominence of a key word, time spent as a customer, age of the issue and/or sub-issue, and a standing of a person making an observation.

6. The method of claim 2, wherein the blog includes information from at least one of the one or more external networks that refers to the issue.

7. The method of claim 1, further comprising the steps of identifying individual ones of the one or more external networks that refer to the issue, wherein the issue is a positive feedback by customers in using a product, and sending a response to individual ones of the identified external networks comprising suggestions by the experts of additional products that can be purchased by customers using the product.

8. The method of claim 1, wherein crawling the one or more internal networks to determine the one or more experts comprises getting at least one of the experts from an expert list and getting a second one of the experts from crawling the internal network based on a key word related to the issue.

9. The method of claim 1, wherein the creating step further comprises refining the one or more experts based on an availability attribute of at least one of the one or more experts.

10. The method of claim 1, further comprising the steps of identifying individual ones of the one or more external networks that refer to the issue and getting a link to the individual ones of the identified external networks.

11. The method of claim 1, further comprising the steps of identifying individual ones of the one or more external networks that refer to the issue and sending a response to individual ones of the identified external networks.

12. The method of claim 11, wherein the response sent to the individual ones of the identified external networks is adjusted to fit the capabilities of the identified networks.

13. The method of claim 1, wherein a facilitator is identified from the one or more experts.

14. The method of claim 1, wherein creating the social network comprises creating an audio conference, a text-based conference, and/or a video conference.

15. The method of claim 14, wherein the conference is an audio conference and further comprising the steps of identifying individual ones of the one or more external networks that refer to the issue and creating an Interactive Voice Response menu that allows one of the one or more experts to vocally respond to the individual ones of the identified networks.

16. The method of claim 15, further comprising converting the voice response to a text response and adjusting the text response to fit the requirements of the individual ones of the identified networks.

17. The method of claim 1, further comprising repeating step (a) and automatically sending a response to at least one of the one or more networks that refer to the issue.

18. The method of claim 1, further comprising repeating steps (a)-(e) to identify feedback on the issue.

19. A system for creating a social network comprising program instructions stored on a non-transitory storage medium, the program instructions comprising:

a. a network crawler configured to crawl one or more external networks to identify an issue in the one or more external networks and determine the capabilities of the one or more external networks;

b. a network crawler configured to crawl one or more internal networks to determine one or more experts on the issue;

c. a social network generator configured to create a social network of the one or more experts to address the issue; and d. wherein the issue is identified in a plurality of external networks, and wherein the network crawler is further configured to and the social network generator is further configured to create a template for the social network, wherein the template comprises a response section for at least one of the plurality of external networks based on a determined capability of the at least one of the plurality of external networks.

20. The system of claim 19, wherein the social network generator is further configured to create, from the template, a blog for the social network.

21. The system of claim 20, wherein the issue is identified on a plurality of external networks and the issue further comprises one or more sub-issues, and the network crawler is further configured to identify which of the one or more sub-issues are on each of the plurality of networks.

22. The system of claim 21, wherein the issue and the one or more sub-issues are identified in the blog based on a ranking.

23. The system of claim 22, wherein the issue and/or the one or more sub-issues are identified based on at least one of the following factors: a prior history of a person generating the issue and/or one or more sub-issues, a tone of a discussion, a prominence of a name, a prominence of a key word, time spent as a customer, age of the issue and/or sub-issue, and a standing of a person making an observation.

24. The system of claim 20, wherein the blog contains information from at least one of the one or more external networks that refers to the issue.

25. The system of claim 19, further comprising the steps of identifying individual ones of the one or more external networks that refer to the issue, wherein the issue is a positive feedback by customers in using a product, and sending a response to individual ones of the identified external networks comprising suggestions by the experts of additional products that can be purchased by customers using the product.

26. The system of claim 19, wherein the network crawler is further configured to crawl the one or more internal networks to determine the one or more experts by getting at least one of the experts from an expert list and getting a second one of the experts from crawling the internal network based on a keyword related to the issue.

27. The system of claim 19, wherein the social network generator is further configured to refine the one or more experts based on an availability attribute of at least one of the one or more experts.

28. The system of claim 19, wherein the network crawler is further configured to identify individual ones of the one or more external networks that refer to the issue and get a link to the individual ones of the identified external networks.

29. The system of claim 19, wherein the network crawler is further configured to identify individual ones of the one or more external networks that refer to the issue and send a response to the individual ones of the identified external networks.

30. The system of claim 29, wherein the network crawler is further configured to adjust the sent response to individual ones of the identified external networks to fit the requirements of the identified networks.

31. The system of claim 19, wherein a facilitator is identified from the one or more experts.

32. The system of claim 19, wherein a conferencing system is configured to create an audio conference, a text based conference, and/or a video conference for the social network.

33. The system of claim 32, wherein the conference is an audio conference and the network crawler is further configured to identify individual ones of the one or more external networks that refer to the issue and an Interactive Voice Response (IVR) system configured to create an IVR menu that allows one of the one or more experts to vocally respond to the individual ones of the identified networks.

34. The system of claim 33, wherein the Interactive Voice Response system is further configured to convert the vocal response to a text response and the social network generator is further configured to adjust the text response to fit the requirements of the individual ones of the identified networks.

35. The system of claim 19, wherein the social network generator is further configured to automatically send a response to at least one of the one or more networks that refer to the issue.

36. The system of claim 19, wherein the social network generator is further configured to identify feedback on the issue.

* * * * *